United States Patent [19]
Turner et al.

[11] 3,913,334
[45] Oct. 21, 1975

[54] METHOD AND APPARATUS FOR CONTROLLING WATER FLOW FROM AN IMPOUNDED BODY OF WATER

[75] Inventors: Lawrence Alexander Turner, Middleton; Roger Peter, Grahamstown, both of South Africa

[73] Assignee: Fluid Dynamics (Proprietory) Limited, Cape Province, South Africa

[22] Filed: Nov. 23, 1973

[21] Appl. No.: 418,239

Related U.S. Application Data

[63] Continuation of Ser. No. 205,121, Dec. 6, 1971, abandoned.

[30] Foreign Application Priority Data
Apr. 7, 1970    South Africa.................... 70/2306

[52] U.S. Cl..................................... 61/25; 61/22 R
[51] Int. Cl.².......................................... E02B 7/40
[58] Field of Search...................... 61/22 R, 23, 25

[56] References Cited
UNITED STATES PATENTS

| | | | |
|---|---|---|---|
| 843,003 | 2/1907 | Davis | 61/25 |
| 952,725 | 3/1910 | Büchler | 61/25 |
| 1,587,616 | 6/1926 | Sudler | 61/25 |
| 1,645,943 | 10/1927 | Cheatham | 61/23 |

*Primary Examiner*—Paul R. Gilliam
*Assistant Examiner*—David H. Corbin
*Attorney, Agent, or Firm*—Wenderoth, Link & Ponack

[57] ABSTRACT

Barrier apparatus for controlling water flow along a channel is disclosed, the apparatus including a float which constitutes a barrier and which moves up and down with respect to the floor of the channel to vary the rate of water flow between the downwardly facing surface of the float and the floor. Such surface is curved so that it acts as an aerofoil whereby the upward pressure on the underside of the float decreases with increasing rate of water flow and increases with decreasing rate of water flow. Substantially constant water levels downstream of the float are obtainable.

5 Claims, 1 Drawing Figure

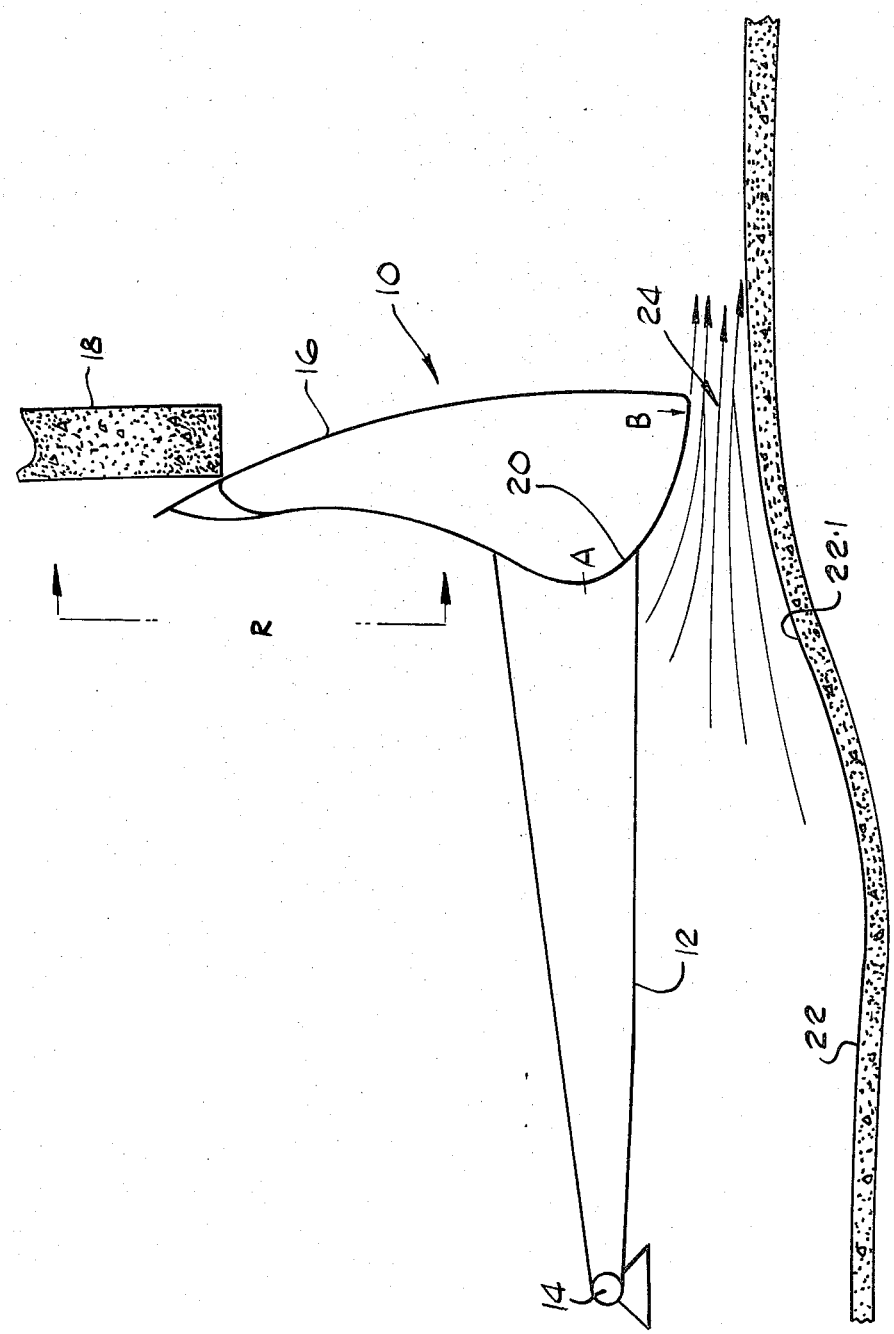

METHOD AND APPARATUS FOR CONTROLLING WATER FLOW FROM AN IMPOUNDED BODY OF WATER

This is a continuation of application Ser. No. 205,121, filed Dec. 6, 1971, now abandoned.

SUMMARY OF THE INVENTION

This invention relates generally to a method of and barrier apparatus for controlling water flow from an impounded body of water. The impounded body of water can be a reservoir or canal.

According to one aspect of the present invention there is provided a method of controlling the rate of flow of water, the method including the step of using static pressure variations caused by variations in the rate of streamlined flow across a curved surface to effect displacement of a control gate.

Preferably the curved surface is provided on the control gate.

According to a further aspect of the present invention there is provided a method of controlling the rate of flow of water from an impounded body of water, in which method the water is caused to flow beneath a float the lower part of which is of curved configuration so that as water flows past it it tends to act as an aerofoil, the direction of curvature of the lower part being such that the upward pressure on the underside of the float decreases with increasing rate of water flow and increases with decreasing rate of water flow.

According to another aspect of the present invention there is provided barrier apparatus for controlling flow of water from an impounded body of water, the barrier apparatus including a float a lower part of which is curved in configuration so that when water is flowing past it it tends to act as an aerofoil, the direction of curvature being such that the upward static pressure exerted on the float by the water flowing therebeneath decreases as the rate of flow increases and increases as the rate of flow decreases.

As the rate of flow depends on the difference between the water level upstream of the float and the level downstream of the float, the effect of the change of static pressure on the float is to close the barrier as the upstream level increases and open the barrier as the upstream level drops, thereby to obtain a substantially constant downstream level.

It is desirable to obtain streamlined flow past the lower surface of the float and for this purpose it is desirable for the floor beneath the float to slope upwardly so that with the curved part of the float it effectively defines a venturi giving the optimum flow pattern.

The float is preferably carried on radius arms so that its movements are not in a straight line but are arcuate.

Desirably the front or downstream face of the float is arcuate in form with the axis about which the arcuate front face is generated co-incident with the axis about which the radius arms rotate, the front face co-operating with an overhead curtain wall.

The float, when viewed in vertical cross section, tapers upwardly so that with increasing depth of immersion of the float the buoyancy decreases.

BRIEF DESCRIPTION OF THE DRAWING

Reference will now be made to the drawing which schematically illustrates one embodiment of the apparatus of the invention.

DETAILED DESCRIPTION OF THE INVENTION

The apparatus illustrated includes a float generally indicated at 10 which is mounted on a plurality of radius arms 12 spaced along the length of the float. The arms 12 can swing about axles 14. The front face 16 of the float 10 is arcuate in form and is generated about an axis co-axial with the common axis of the axles 14. The front surface 16 co-operates with a depending curtain wall 18, there being sealing means (not shown) between the wall 18 and the face 16.

The lower part of the float 10 is constituted by a curved plate 20 which extends between the points marked A and B.

The float 10 is arranged in a structure having a concrete floor 22. The part 22.1 of the floor 22 converges with the plate 20 so as to form, in effect, a venturi nozzle 24 through which water flowing from the impounded body of water must flow to reach the downstream side of the barrier apparatus. The shape of the floor 22 is such that streamlined flow through the venturi 24 occurs.

It will be noted that the float tapers upwardly so as to provide less buoyancy at the top of the float than at the lower part.

Upstream water is permitted to enter the float 10 via the axles 14 and the arms 12 which, for this purpose, include flow channels therethrough.

The operation of the barrier apparatus will now be described.

When the float is in the closed position, that is, when the lowest part of the float rests on the floor 22 then the hydrostatic pressure exerted on the underside of the plate 20 is balanced by the hydrostatic pressure exerted on the top surface of the plate 20 by virtue of the fact that the interior of the float is in communication with the upstream body of water via the axle 14 and the arms 12. To cause the float to move upwardly thus permitting water flow past the barrier, water is withdrawn from the interior of the float via one of the arms 12 and the axle 14 and air caused to take its place. As soon as the float has lifted water commences to flow therebeneath and as soon as flow commences the hydrostatic pressure exerted on the underside of the plate 20 decreases. The greater the velocity of flow, the greater the pressure drop. Thus, for practical purposes, the effect of an increase in flow velocity is to increase the weight of the float by decreasing the upward hydrostatic pressure.

It will be understood that the rate of flow is dependent upon the difference between the upstream level and the downstream level. Consequently, as the upstream level rises so the apparent weight of the float increases, the barrier apparatus tends to close itself automatically thus maintaining a constant downstream level. Conversely, if the upstream water level drops then the rate of flow decreases, the upward hydrostatic pressure increases and the float tends to lift thus increasing the flow rate and maintaining a constant downstream level.

The shape of the plate 20 is such that it can be regarded as functioning as an aerofoil. The exact dimensions and configuration of this plate depend on the characteristics depend required of the specific barrier apparatus, but is so shaped and dimensioned as to provide an appropriate decrease in pressure with increasing velocity.

The length of the arms 12 in relation to the maximum amount of opening is the most important factor in controlling what can be termed the "angle of attack" of the plate 20 in relation to the streamlines in the flow pattern beneath the float 10.

The upwardly tapered configuration of the float 10 ensures that, with increasing upstream level, there is a decreasing amount of buoyancy.

The barrier apparatus described above will operate satisfactorily with the float 10 completely submerged without becoming unstable. The stable operating range has been indicated in the drawing. In this connection reference is made to the range indicated at R.

As stated above, the shape of the float is such that the upper part thereof is less buoyant than the lower part. The proportions of this upper part are such that the extra buoyancy which results from an increase in upstream level is insufficient to lift the gate. In fact, the increased velocity effect on the plate 20 resulting in a lessening of the upward static pressure on the gate, is greater than the increase in upward pressure due to increased buoyancy. Hence under these conditions, i.e. increased upstream water level, the gate tends to close rather than open.

To effect initial opening of the gate in the described apparatus water is withdrawn from the interior of the float by a control apparatus (not shown), the amount of water withdrawn being such that the position that the gate adopts ensures the desired flow rate under the head conditions prevailing. The gate is then self regulating, the control apparatus only being needed again when the gate is to be closed.

Where the water being handles is silty, or contains raw sewerage, then the interior of the float is not connected to this water via the arms 12. Instead an independant pumped supply would be employed. In a modified construction, initial opening and final closing of the gate could be effected by weights or a mechanical counter-weight arrangement in place of water flow control methods. In such arrangements no water flow apparatus would be required although simple means to enable the gate to be flooded so as to close it or to drain it so as to cause it to open are advantageous.

A further method of controlling initial opening and final closing of the gate can include supplying compressed air to the gate to expel water therefrom. A still further method includes connecting a suction line to the top of the gate and to draw water from a source lower than the float so that the float became filled with water when it was necessary to close the gate. In the latter case the gate opens when the interior is connected to atmospheric pressure, and closes when negative pressure is applied to the interior of the float.

We claim:

1. Barrier apparatus for controlling flow of water, in a direction from an impounded body of water upstream of said apparatus to a body of water downstream of said apparatus, so as to obtain a substantially constant water level downstream of the apparatus, said apparatus comprising:
   i. a float forming a water barrier and having a smoothly curved, convex surface, said surface facing in a downward and upstream direction;
   ii. a floor beneath the float surface, the floor having a curved profile and rising, in said direction of water flow, so as to converge with said float surface to define a venturi therewith;
   iii. means for selectively varying the buoyancy of the float so that it can be sunk into contact with the floor or raised to an open position in which said float surface and said floor have a gap therebetween, thereby allowing water to flow in said direction; and
   iv. said venturi comprising means, responsive to changes in upward force exerted on said float surface due to changes in flow velocity of said water, to displace said float downwardly and reduce the magnitude of said gap as said velocity increases with increasing upstream water level within a given range of upstream water levels, and to displace said float upwardly and increase the magnitude of said gap as said velocity decreases with decreasing upstream water level within said given range of upstream water levels.

2. Barrier apparatus according to claim 1, further comprising radius arms mounting said float and forming means for constraining said float to move, during its opening and closing movement, along an arcuate path about an axis upstream of said float.

3. Barrier apparatus according to claim 2, wherein said float further includes a front face which is arcuate in form with the axis about which the arcuate front face is generated co-incident with said axis about which the radius arms rotate, and further comprising an overhead curtain wall co-operating with said front face.

4. Barrier apparatus according to claim 1, in which the float, when viewed in vertical cross section, tapers inwardly and upwardly so that with increasing depth of immersion of the float, the rate of increase in buoyancy decreases.

5. A method of controlling flow of water, in a direction from an impounded body of water upstream of a control point to a body of water downstream of said control point, so as to obtain a substantially constant level downstream of the control point, said method comprising:
   i. impounding the body of water by means of a float having a smoothly curved, convex surface facing in a downward and upstream direction;
   ii. forming beneath the float a floor having a curved profile which floor rises, in said direction of water flow, so as to converge with said float surface and define a venturi therewith;
   iii. selectively adjusting the buoyance of said float so as to cause said float to take up a position in which said surface of the float is spaced from the floor thereby to define between the floor and float surface a gap through which water flows from upstream of said control point to downstream of said control point; and
   iv. employing changes which occur in upward force exerted on said float surface, due to changes in flow velocity of said water, and displacing the float downwardly and reducing the magnitude of said gap as the velocity of flow increases with increasing upstream water level within a given range of upstream water levels, and displacing the float upwardly and increasing the magnitude of said gap as the velocity of flow decreases with decreasing upstream water level within said given range of upstream water levels, thereby maintaining the level of water downstream of said float substantially constant.

* * * * *